Nov. 30, 1965     J. J. MADDEN     3,221,137
COMBINED TABLE AND COOKER
Filed July 5, 1963

INVENTOR.
John J. Madden
BY
Roberts Cushman & Grover
ATT'YS 3,221,137
COMBINED TABLE AND COOKER
John J. Madden, 18 St. Martin St., Charlestown, Mass.
Filed July 5, 1963, Ser. No. 293,925
1 Claim. (Cl. 219—218)

This invention relates to a combined table and cooker wherein a table, having a top supported by legs at a convenient distance above the floor, has combined therewith an electrically-heated grill of conventional type, so arranged that, when desired, the grill may be exposed substantially at the level of the table top for use, but when not in use is substantially concealed, while the table top presents almost its entire surface for normal use.

Such a device is of utility in quarters so small that there is not sufficient space to accommodate both table and a separate cooking appliance, since it affords substantially the full area of the table top for use under most conditions, but provides storage space for the grill when the latter is not in use, while making it unnecessary to remove the grill from its storage compartment when its use is required. The invention provides a convenient piece of furniture for use on a screen porch, patio, or out-of-doors where electrical current is available from an external source through an extension cord, thus making it easy to have "cook-outs" without requiring the usual complicated paraphernalia and, if the cooking is not to be prolonged, making it possible to carry out the cooking operation by current derived from a high-powered automobile or truck battery.

Thus, the principal object of the present invention is to provide, in a single piece of furniture, a combined table and cooking appliance such that substantially the entire area of the table is at most times available for ordinary use, and such that only the simplest manipulation is required to make the device available for cooking.

Figure 1:
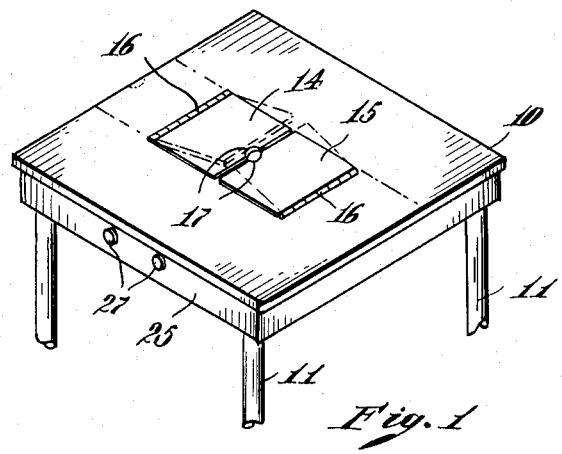
FIG. 1 is a fragmentary, small-scale perspective view, showing the table with its top available for ordinary use, but indicating in broken lines how the folding leaves, which form a part of the table top, may be lifted to expose the cooker.
Figure 2:
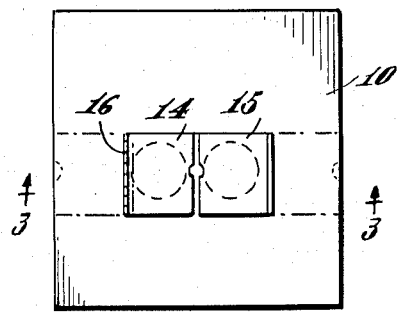
FIG. 2 is a plan view, to smaller scale than FIG. 1, indicating in dotted lines the location of the grill.
Figure 3:
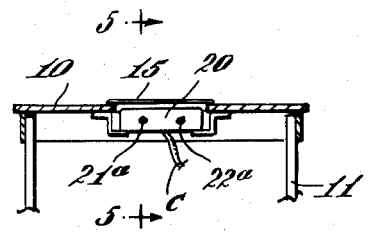
FIG. 3 is a section substantially on the line 3—3 of FIG. 2, with the parts in the same position as in FIG. 2.

Referring to the drawings, the numeral 10 (FIG. 1) designates the top of the table which should desirably be of metal, for instance stainless steel or aluminum, and which is supported upon legs 11 which are desirably removable to facilitate the storage of the table, if desired, when not in use. With this in view, these legs may, for example, be of nickel-plated tubing ¾ of an inch in diameter and having screw-threaded upper ends which are received in appropriate sockets at the underside of the table top.

The table top has an aperture 12, (FIG. 4) here shown as rectangular, and which may be centrally located or in any other suitable and desired position, being shown herein as spaced equally from the right and left edges of the table top, but somewhat nearer to the front edge than to the rear edge.

Under normal circumstances, while the table is in use merely as a table, this aperture is substantially closed by two hinged leaves 14 and 15 which are hinged to the table top proper by hinges 16, preferably piano-type hinges, so arranged that the upper surfaces of the leaves 14 and 15, when closed, are substantially flush with the upper surface of the table top proper. To facilitate opening these leaves, their proximate edges are preferably provided with semi-circular recesses 17, thus providing an opening into which the finger may be inserted for applying upward pull to the leaves.

Adjacent to those edges of the opening at which the leaves are hinged, supporting brackets 18 are secured, to the undersurface of the table top, these brackets being of Z-shape, having the horizontal upward members which are secured to the table top for example, by spot-welding or rivets and the vertical legs 18 which support the horizontal flange members 19 at such a distance below the table top, such that a selected conventional grill 20, when resting upon the flanges 19, has the upper surfaces of its heating elements 21 and 22 substantially at the level of the undersurface of the table top where they form supports for the closed leaves.

Desirabley, in order that the grill may be prevented from moving out of its desired position, the legs 18 of the supporting brackets may be provided with screw-threaded openings for the reception of centering screws 23 (FIG. 4) which may be turned so that their inner ends contact the sides of the grill 20, thus clamping the latter in position, although permitting its ready removal upon retraction of the screws 23.

The usual cord C for supplying current to the grill may be of a length such as to reach a convenient outlet supplying commercial electrical current, or if current be available from a battery or similar source, providing sufficient amperage, then current for heating the grill may be derived from such source.

Figure 5:
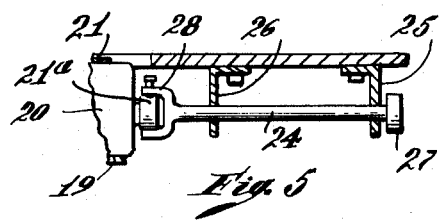
FIG. 5 is a fragmentary section, substantially on the line 5—5 of FIG. 3, illustrating an arrangement whereby the control handles of the grill may be manipulated from the front of the table.

As here shown, the grill comprises two cooking elements 21 and 22 which are controlled by the usual rotary knobs or handles 21a and 22a respectively. Since the grill itself is disposed beneath the table top and at some distance from the edge of the table top, it may be desirable to provide means for turning the control knobs from a point nearer the edge of the table. Thus as illustrated in FIG. 5, there is provided a rod 24 which turns and slides in suitable openings in the usual marginal stiffening apron 25 of the table top and in a bracket 26 arranged at the underside of the table top. The rod has a knob 27 at its forward end by means of which it may be turned and moved longitudinally. At its rear or inner end, this rod carries a socket device 28 designed to receive the knob 21a of the grill and whose internal shape is such as to grip the knob 21a and turn the latter when the rod is turned. By pulling the rod 24 forwardly, the socket device may be released from the knob 21a, thus permitting the removal of the grill when desired. It is understood that both knobs 21a and 22a may be provided with such actuating devices if desired. However, the knobs 21a and 22a may be turned by reaching under the table and turning them manually, if such actuating devices are not provided.

The opening 12 in the table is arranged at such a distance from either the front or rear edge of the table top as to permit the grill to be pushed up beneath the table top and slipped onto the supporting flanges 19.

Figure 4:
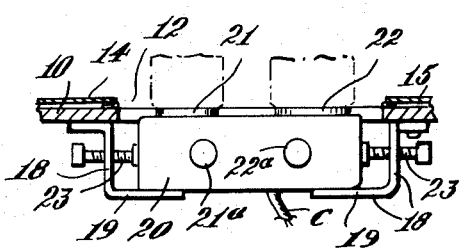
FIG. 4 is a fragmentary section, in the same plane, but to larger scale than FIG. 3, showing the leaves folded over to inoperative position and indicating the position of the grill when in use.

While ordinarily the leaves 14 and 15 will be turned back, as shown in FIG. 4, preparatory to cooking, it is contemplated that if these leaves be of proper thickness and material, they may be left resting upon the heating elements so as to be heated by the latter, so that the cooking may be carried out on the tops of the leaves themselves, either directly, using the leaves in the manner of a griddle for cooking pancakes or the like, or as supports for cooking utensils.

While one desirable embodiment of the invention has herein been illustrated and described by way of example, it is to be understood that the invention is broadly inclusive of any and all modifications falling within the scope of the appended claim.

What is claimed is:

In combination, a table having a substantially rectangular metal top supported by legs, the table top having a centrally located aperture of a size such as to leave substantial areas at all sides of the aperture available for ordinary use, metal leaves hinged to the table top at opposite edges of the aperture and whose surfaces, when they are closed, are substantially flush with the upper surface of the adjacent area of the table top, brackets attached to the underside of the table top at opposite edges, respectively, of the aperture, said brackets having horizontal flanges so spaced from the underside of the table top as to provide a support for a commercial electric grill with the upper surface of the heating element of the grill substantially at the level of the undersurface of the table top whereby the upper face of the grill may constitute a support for the hinged leaves when the latter are closed; grill centering means carried by the brackets for positioning, but releasably retaining the grill in operative position, the grill being of the kind which has a rotary switch-actuating knob, and means for turning the knob including a rigid rod, brackets supporting said rod beneath the table top with its axis substantially horizontal and aligned with the axis of rotation of the switch-controlling knob of the grill, the rod being supported for rotation and also for axial movement and being provided at its inner end with a socket device designed releasably to grip the switch-actuating knob of the grill, and having a handle at its outer end accessible for actuation at a point below and near one edge of the table top whereby the rod may be turned for actuating the switch-controlling knob or alternatively may be moved axially to disengage the socket device from the knob of the grill thereby permitting removal of the grill from the supporting brackets when desired.

References Cited by the Examiner
UNITED STATES PATENTS

| | | | |
|---|---|---|---|
| 1,120,758 | 12/1914 | Stirn | 219—218 |
| 1,975,320 | 10/1934 | Hamilton | 219—218 |
| 2,548,932 | 4/1951 | Ball | 219—218 |
| 2,866,956 | 12/1958 | Miller et al. | 219—218 X |

RICHARD M. WOOD, *Primary Examiner.*